(12) United States Patent
Blanc et al.

(10) Patent No.: US 8,607,694 B2
(45) Date of Patent: Dec. 17, 2013

(54) BOILER FOR A MACHINE FOR MAKING HOT BEVERAGES

(75) Inventors: Jean-Pierre Blanc, Nice (FR); Alain Goering, Nice (FR)

(73) Assignee: Compagnie Mediterraneenne des Cafes (SA), Carros (FR)

( * ) Notice: Subject to any disclaimer, the term of this patent is extended or adjusted under 35 U.S.C. 154(b) by 609 days.

(21) Appl. No.: 12/676,458

(22) PCT Filed: Sep. 5, 2008

(86) PCT No.: PCT/EP2008/061781
§ 371 (c)(1),
(2), (4) Date: Mar. 4, 2010

(87) PCT Pub. No.: WO2009/030753
PCT Pub. Date: Mar. 12, 2009

(65) Prior Publication Data
US 2010/0199853 A1    Aug. 12, 2010

(30) Foreign Application Priority Data

Sep. 7, 2007  (FR) ...................................... 07 57415
Jun. 27, 2008  (FR) ...................................... 08 54346

(51) Int. Cl.
| A47J 31/00 | (2006.01) |
| A23F 5/00 | (2006.01) |
| F24H 1/00 | (2006.01) |
| A47J 31/44 | (2006.01) |
| A47J 31/10 | (2006.01) |
| F24H 1/10 | (2006.01) |
| F24H 3/04 | (2006.01) |

(52) U.S. Cl.
CPC . *A47J 31/44* (2013.01); *A47J 31/10* (2013.01); *F24H 1/102* (2013.01); *F24H 3/0405* (2013.01)
USPC ............. 99/323.3; 99/275; 99/288; 99/302 R; 392/479; 392/485

(58) Field of Classification Search
CPC ........... A47J 31/44; A47J 31/10; F24H 1/102; F24H 3/0405
USPC ............. 99/275, 323.3, 288, 302 R; 392/479, 392/485
See application file for complete search history.

(56) References Cited

U.S. PATENT DOCUMENTS 3,898,428 A  *  8/1975  Dye ............................... 392/489
4,199,675 A  *  4/1980  Sharpless ...................... 392/484
(Continued)

FOREIGN PATENT DOCUMENTS

| DE | 103 22 034 | 12/2004 |
| EP | 0 345 528 | 12/1989 |

OTHER PUBLICATIONS

International Search Report dated, Jun. 2, 2009, from corresponding PCT application.

*Primary Examiner* — Gene Kim
*Assistant Examiner* — Alexander Niconovich
(74) *Attorney, Agent, or Firm* — Young & Thompson

(57) ABSTRACT

The present device concerns a boiler for use in a machine for making hot beverages including a diffuser (32) with a first wall (33) destined to be placed in contact with the liquid to be heated and a second wall (34) opposite first wall (33), heating element (11) consisting of at least one thick film or photo-etching resistor (31) arranged on second wall (34) of diffuser (32), a body which, with first wall (33) of diffuser (32), defines a heating volume (11) inside which the liquid is to be heated, characterized in that it is arranged so that heating volume (11) is positioned on either side of heating element (30). Also described is the fabrication of machines for preparing hot beverages such as coffee.

15 Claims, 15 Drawing Sheets

(56) References Cited

U.S. PATENT DOCUMENTS

| | | | |
|---|---|---|---|
| 4,531,046 A * | 7/1985 | Stover | 392/442 |
| 4,687,907 A * | 8/1987 | Barkley et al. | 392/473 |
| 4,975,559 A * | 12/1990 | Frisch | 392/449 |
| 6,459,854 B1 * | 10/2002 | Yoakim et al. | 392/479 |
| 6,779,435 B1 * | 8/2004 | Iacobucci | 99/302 R |
| 6,943,325 B2 * | 9/2005 | Pittman et al. | 219/481 |
| 7,057,140 B2 * | 6/2006 | Pittman | 219/481 |
| 7,286,752 B2 * | 10/2007 | Gourand | 392/479 |
| 7,486,877 B2 * | 2/2009 | Boussemart et al. | 392/485 |
| 7,907,835 B2 * | 3/2011 | Boussemart et al. | 392/479 |
| 8,180,207 B2 * | 5/2012 | Shirai et al. | 392/491 |
| 2010/0199853 A1 * | 8/2010 | Blanc et al. | 99/323.3 |
| 2011/0174160 A1 * | 7/2011 | Blanc et al. | 99/288 |
| 2012/0037009 A1 * | 2/2012 | Blanc et al. | 99/302 R |

\* cited by examiner

# BOILER FOR A MACHINE FOR MAKING HOT BEVERAGES

The present invention concerns a boiler for use in a machine for preparing hot beverages. It will apply to boilers in coffee-making machines in particular.

Known boilers have a body joined to a liquid tank. A diffuser encloses the body and covers one face of the body in order to define a volume in which the liquid circulates. The diffuser is also equipped with a heating resistance on its face opposite the one facing the main body.

This type of machine has proved to be generally satisfactory. However, an advantage would be gained by improving the performances of known boilers and in particular improving their thermal efficiency. Therefore, the invention concerns a boiler for use on a machine for preparing hot beverages comprising a diffuser which consists of a first wall designed to be placed in contact with the liquid to be heated and a second wall opposite the first wall. In addition, the boiler is equipped with heating means comprising at least one thick film or photo-etching resistor, also named serigraphed or photo-engraved resistor, arranged on the second wall of the diffuser and a body which, with the first wall of the diffuser, defines a heating volume inside which the liquid is to be heated. In a characteristic manner, the boiler is arranged so that the heating volume is positioned on either side of heating means.

As a result, the hottest part of the boiler is positioned at the heart of the latter and the coldest part on the periphery of the boiler. Consequently, the differences of temperature between the boiler environment and the surfaces of the boiler in contact with this environment are less than are to be found in known boilers in which the thick film or photo-etching resistor surrounds the heating volume.

This leads to less heat loss between the boiler and its environment. Consequently, this improves the thermal efficiency of the boiler according to the invention.

Moreover, as the hottest part of the boiler is not positioned on the boiler periphery, there is only a limited risk of the boiler environment deteriorating or of fires starting due to an abnormally high temperature.

Moreover, the present invention lessens the danger of a user being burnt compared to known boilers. Indeed, with known boilers there is a high risk that a person will be burnt when touching the boiler while the thick film or photo-etching resistor is still activated or when the boiler retains a high temperature under the effect of its thermal inertia even after inactivation of the thick film or photo-etching resistor.

As an option, but even so advantageous, the invention may present at least one of the following characteristics:

the body is equipped with a thermal insulating material with thermal conductivity below 1 W/m/K.

For instance, the body may be made of plastic material. As a result, the body acts as thermal insulation for all the boiler. This reduces the heat exchanges between the boiler and its environment. It improves the efficiency of the boiler and increases the rate of heating. This structure of the boiler associated with this type of thermal insulating material limits the thermal inertia of the boiler.

This leads to a very fast build up of temperature. For instance, with an 1800-watt boiler the temperature of 8.5 cm$^3$ of water can be increased from 20 to 95° C. in less than 10 seconds:

the diffuser has a thermal conductivity that is above or equal to 10 W/m/K.

the body and the diffuser are arranged so that they together define at least one heating chamber. Therefore, the liquid is relatively free to circulate in the heating volume.

the body and the diffuser are arranged so that they together define a liquid circulating channel. This guides the liquid through the boiler.

According to a first variant, the surface of the body coacting with the diffuser to form the channel is roughly smooth and the diffuser has at least one groove. According to a second variant, the surface of the body co-acting with the diffuser to form the channel has at least one groove and the surface of the diffuser that is to be in contact with liquid is roughly smooth.

The heating volume substantially surrounds the thick film or photo-etching resistor.

Therefore, the liquid goes all around or at least almost all around the thick film or photo-etching resistor.

In a first embodiment, the diffuser is roughly cylindrical and acts as a sleeve that houses on the diffuser. To this end, the diffuser has an roughly circular section or a polygonal section, preferably square.

In a second embodiment, the heating means have at least two diffusers the two walls of which are turned so as to face one another. The diffusers form roughly flat plates. The device comprises a support destined to receive the diffusers and the diffusers are situated on either side of the support. The support has thermal conductivity that is less than or equal to 1 W/m/K, the support is made of a material able to withstand temperatures above 120° C. and with excellent mechanical characteristics such as polysulfone, (PSU) polyamide (Pa), polybutylene terephthalate (PBT), or any other material with glassfibre stiffeners and recognised food industry quality.

As a result, the diffuser only transmits a small amount of the heat to the support. This characteristic limits the thermal inertia of the boiler. Consequently, it improves its efficiency and increases the rate of heating.

The support includes:

at least one central zone destined to receive a diffuser and, at least one peripheral zone around this central zone destined to receive a flask forming one part at least of the body so that an internal wall of the flask is arranged opposite of the first wall of the diffuser and with this diffuser defines one part at least of the heating volume.

The boiler comprises at least one seal positioned between the first wall of the diffuser and the body so as to ensure the seal of heating volume.

This solution overcomes the need for any means ensuring specific seal between the diffuser and the support. In fact, the heating means, comprising in particular the thick film or photo-etching resistor, are positioned at the interface between the diffuser and the support. This characteristic ensures an effective seal without having recourse to complex solutions.

the support and the flask form a single entity.

the device has removable fixing means arranged to allow joining and removable separation of the body on the support.

Thus, the boiler can be assembled and dismantled thereby making it easier to clean or carry out any repairs. This characteristic prolongs the life of the boiler and satisfies the eco-design requirements.

the removable fixing means include bolt-nut connectors the removable fixing means include means for clipping the body on the support. Therefore, boiler assembly and removal do not require the use of any special tools. This considerably facilitates its maintenance or recycling.

the support is symmetrical on a median plane.

the boiler is symmetrical on a median plane.

Therefore, there is no imposed direction for fitting a boiler on a machine.

the support has two faces, each one of these faces is intended to receive a diffuser and a flask.

the boiler includes liquid connection means arranged to ensure that the liquid enters the boiler and exits the boiler.

the boiler has electrical connection means arranged to establish an electrical connection between the thick film or photo-etching resistor and a power supply.

Moreover, a machine according to the invention is planned with any one of the above characteristics.

Other characteristics, aims and advantages of the invention will appear on reading the detailed description below and examining the appended drawings given as non restrictive examples:

Figure 1:
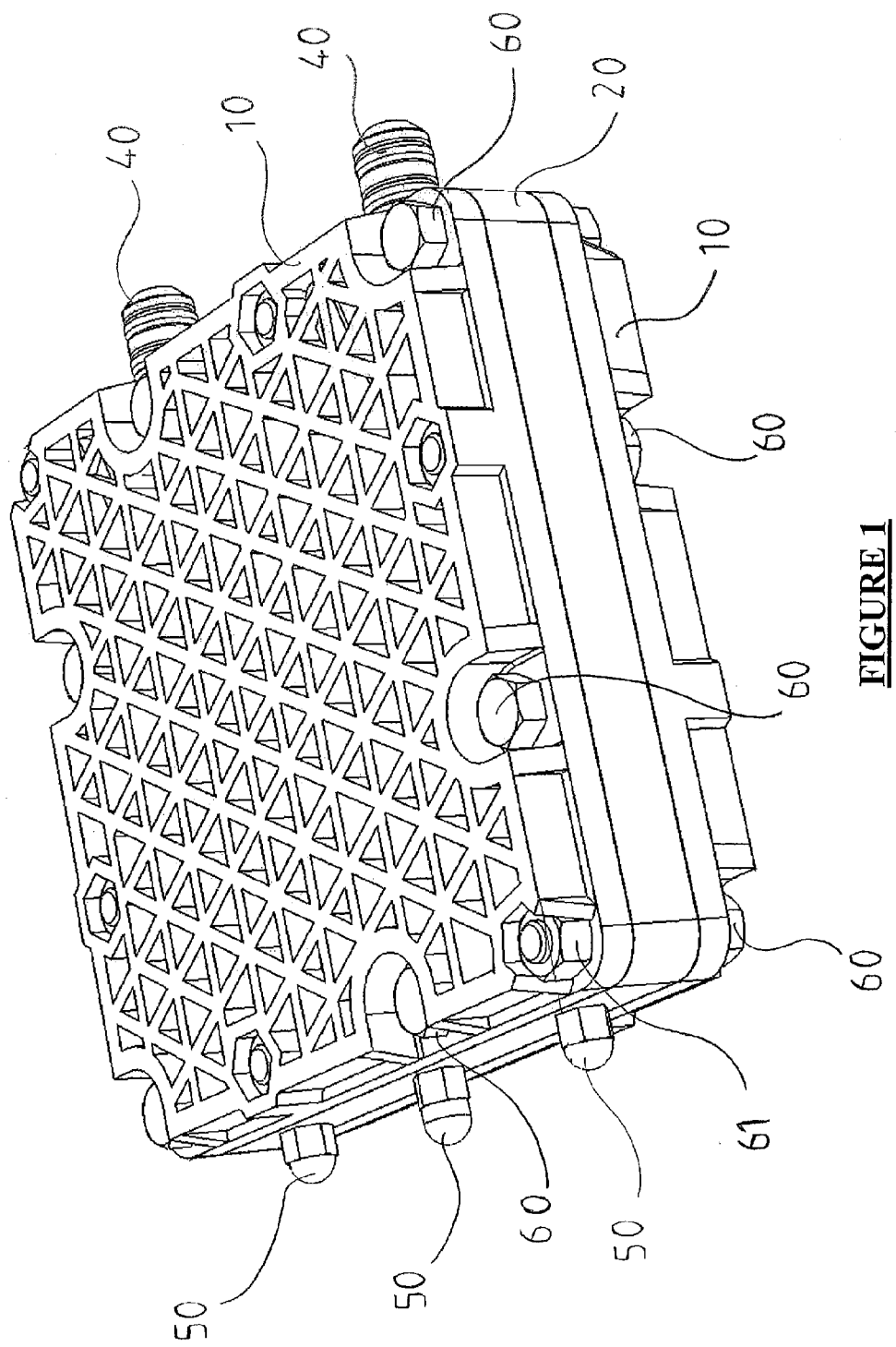
FIG. 1 is a view in perspective of the example of the boiler according to the invention.
Figure 2:
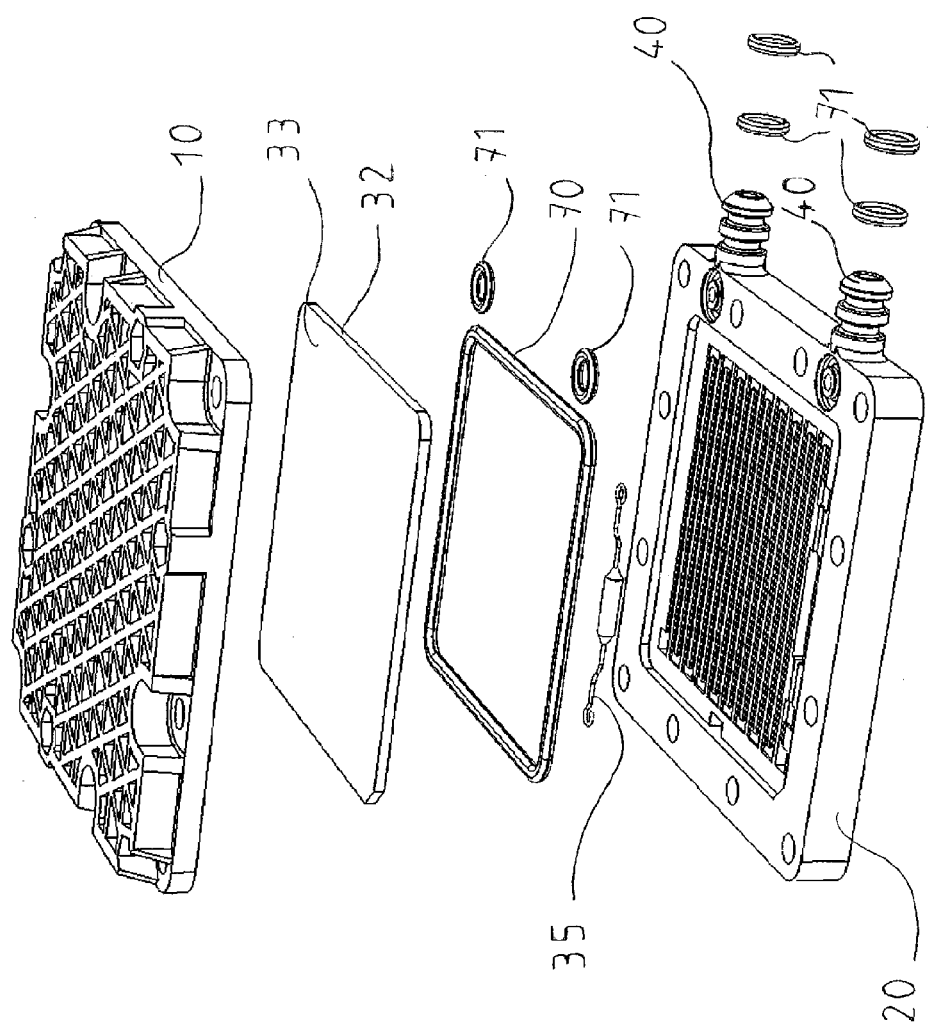
FIG. 2 is an exploded view of part of the boiler according to the example illustrated in FIG. 1.
Figure 3:
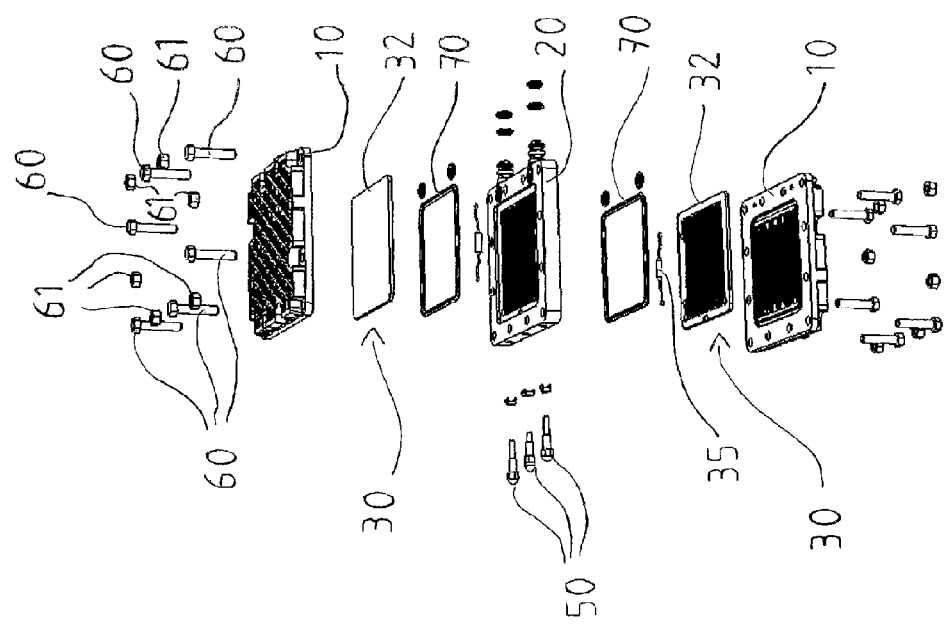
FIG. 3 is an exploded view of the boiler according to the example illustrated in FIG. 1.
Figure 4:
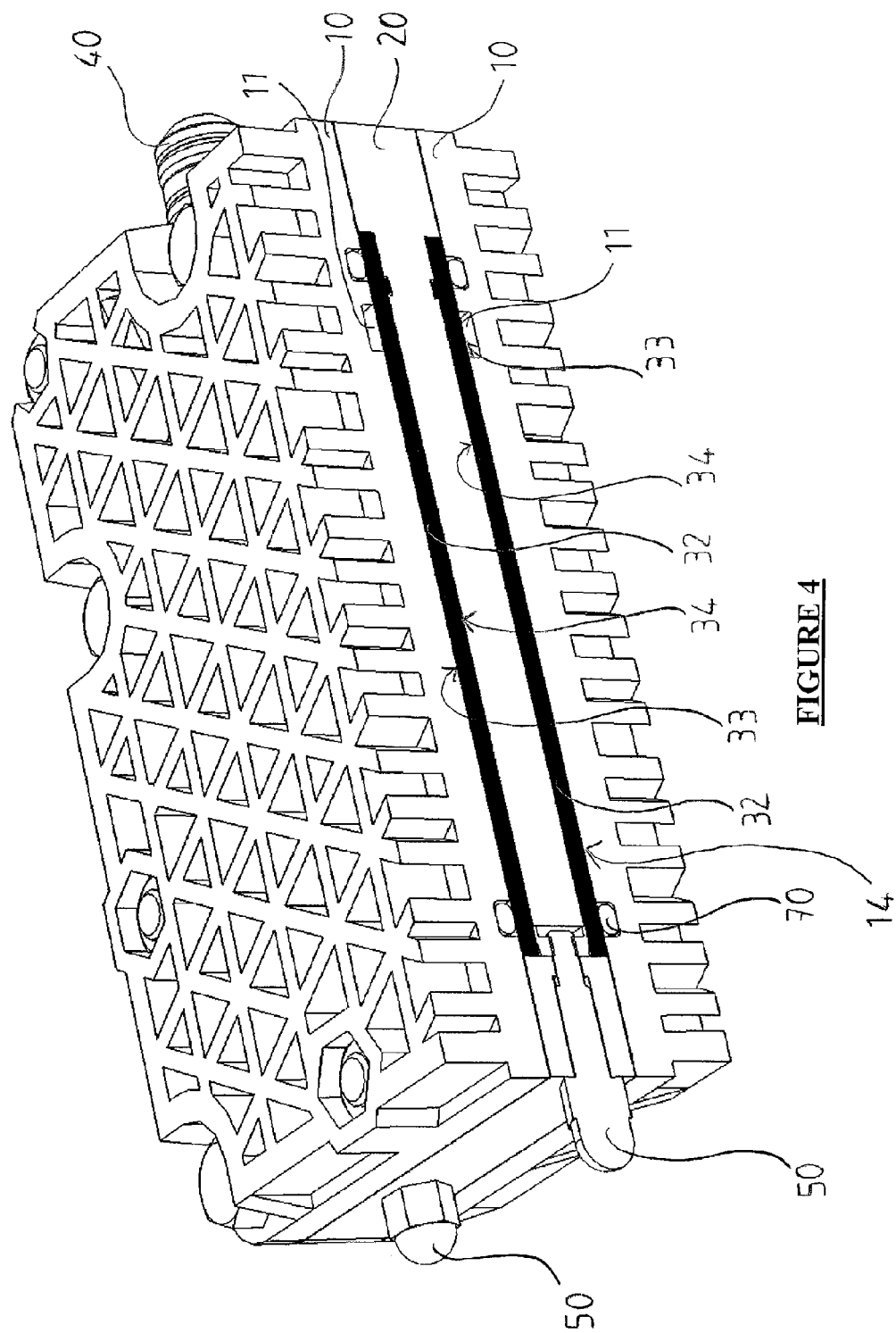
FIG. 4 is a view in perspective of the boiler shown in FIG. 1 according to a section executed along a median plane.
Figure 5:
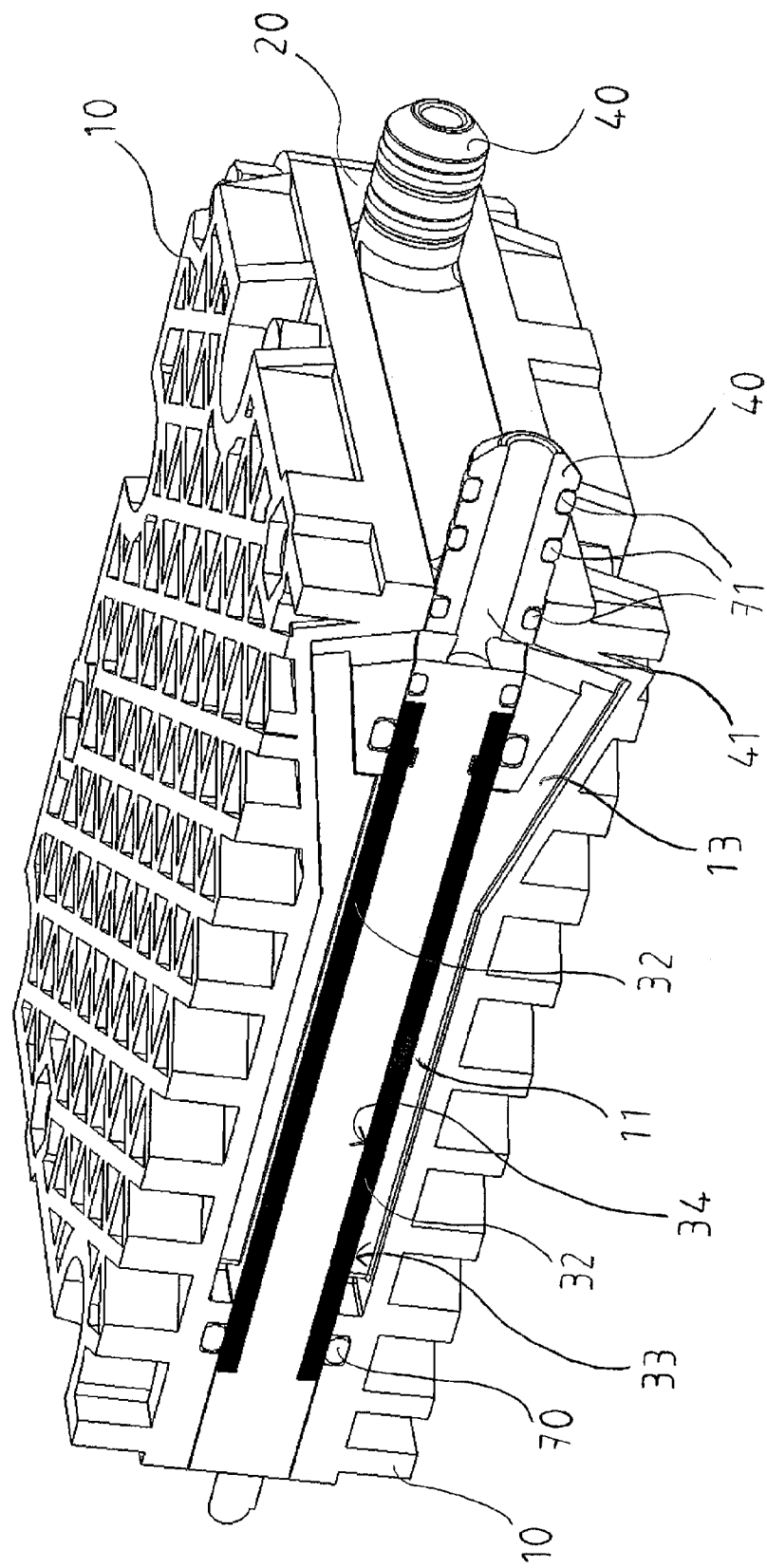
FIG. 5 is a view in perspective of the boiler shown in FIG. 1 according to a section along a plane parallel to the median plane of FIG. 4.

A non restrictive embodiment of the boiler according to the invention will now be detailed with reference to FIGS. 1 to 8.

The boiler comprises a body and heating means 30 forming a heating volume 11 with the body inside which a liquid will flow and be heated. More especially, heating means 30 are equipped with at least one diffuser 32 with a first wall 33 destined to enter into contact with the liquid to be heated. This first wall 33 is intended to bear on an internal face 14 of the body in order to define heating volume 11.

Figure 6:
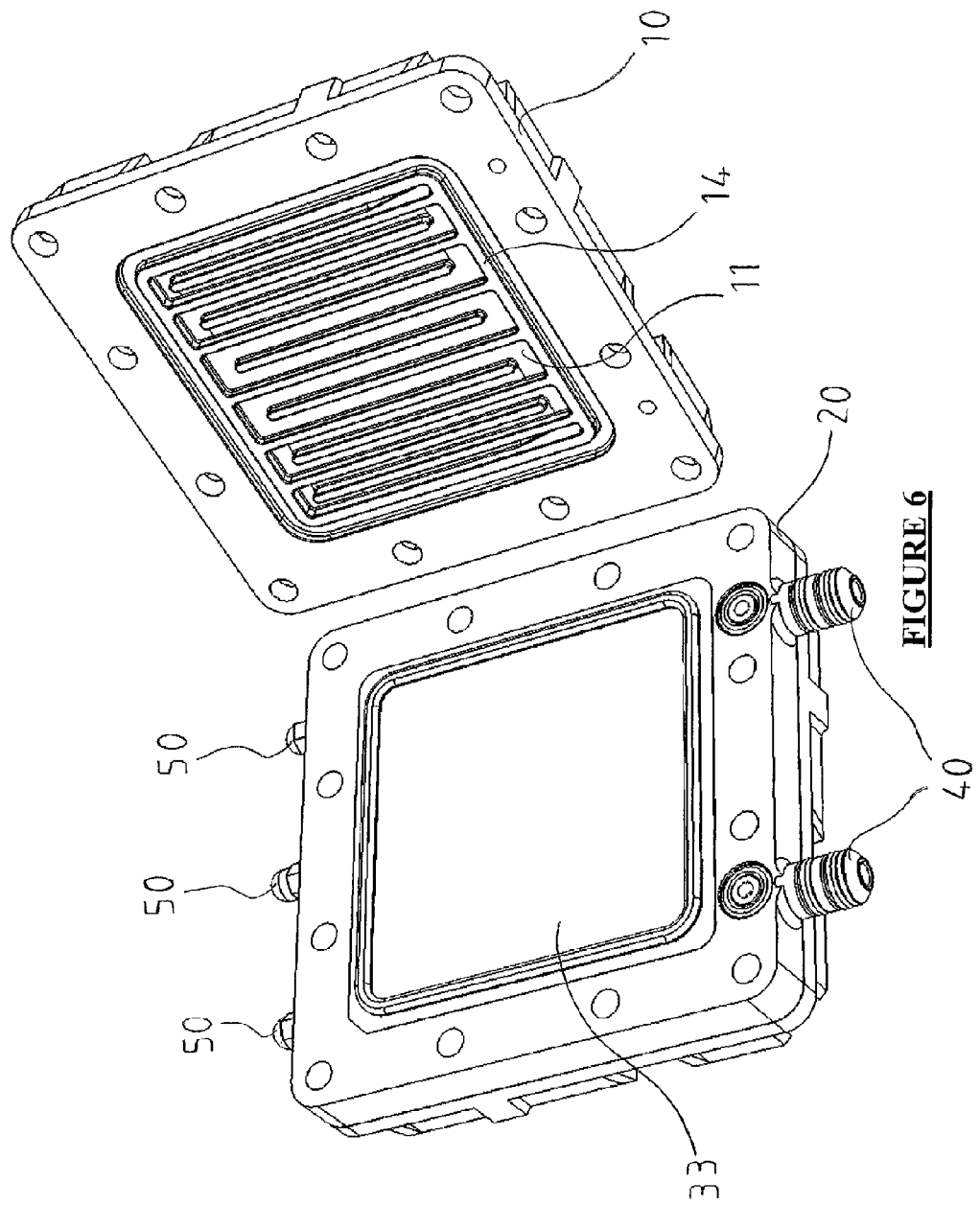
FIG. 6 is a view in perspective of a support, a diffuser and a flask according to the example of the boiler shown in FIG. 1.
Figure 7:
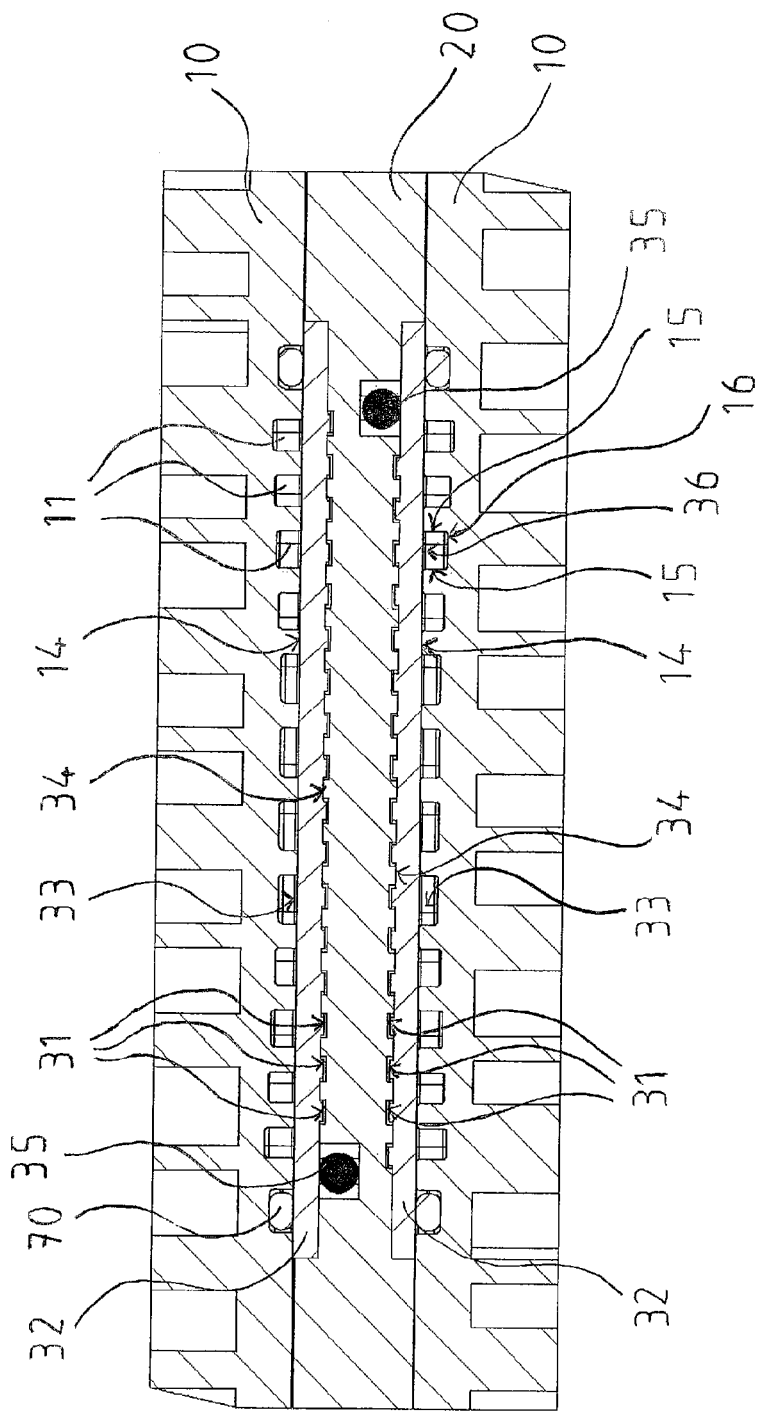
FIG. 7 is a sectional view of the boiler shown in FIG. 1 according to a plane normal to the median plane in FIG. 4.

In the example shown, heating volume 11 defines a circulation channel in the form of a coil. As shown in FIGS. 6 and 7, this channel has two transversal walls 16, 36 and two side walls 15, 15. A first transversal wall 36 is supported by first wall 33 of the diffuser and second transversal wall 16 is supported by internal face 14 of the body. Side walls 15, 15 are supported by the body and extend in the direction of diffuser 32. This embodiment is preferred when the material used for the diffuser has good mechanical strength and/or good thermal conductivity.

Figure 14:
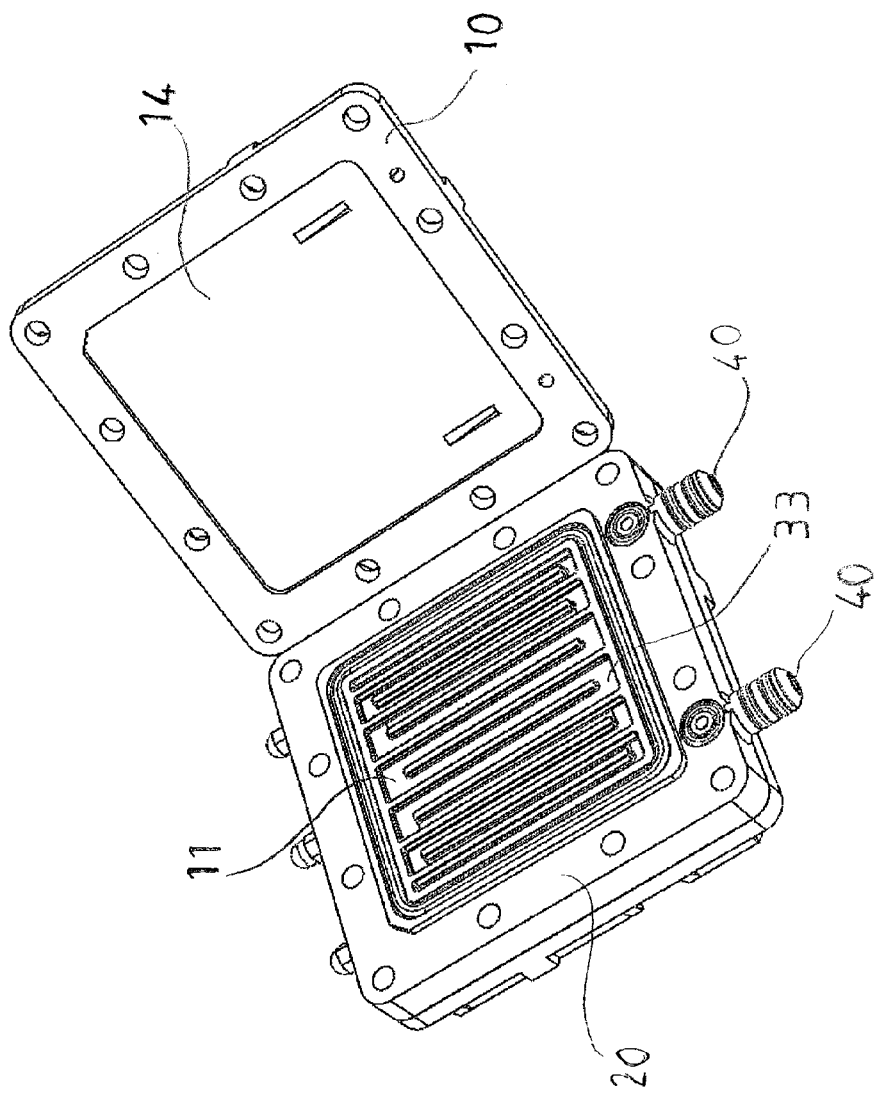
FIG. 14 is an alternative embodiment to the one shown in FIG. 6.
Figure 15:
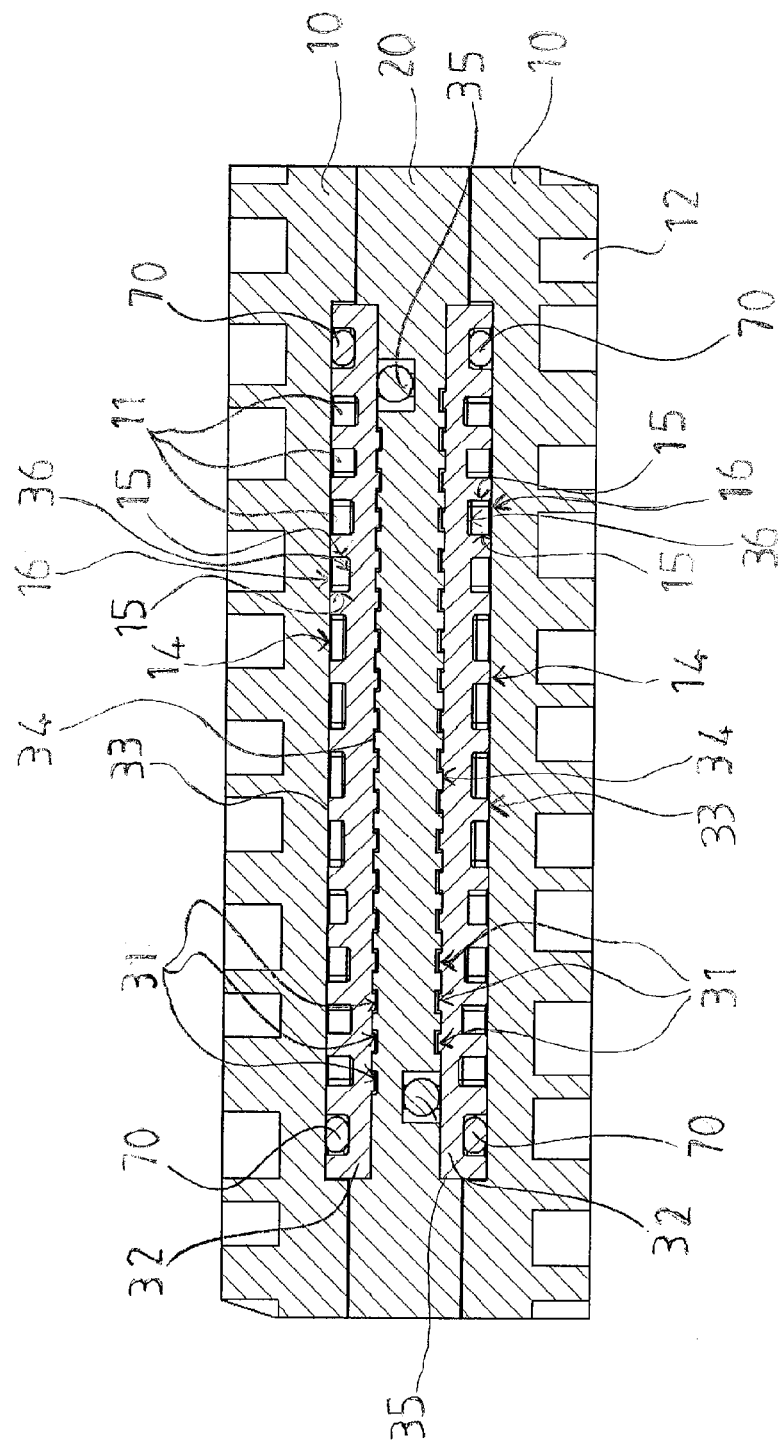
FIG. 15 is an alternative embodiment to the one shown in FIG. 7.

In an alternative embodiment, side walls 15, 15 are supported by diffuser 32. In this alternative embodiment, the diffuser is made of more material than in the previous variant. Side walls 15, 15 increase the contact surface between diffuser 32 and the liquid. This promotes heat exchanges. Side walls 15, 15 also act as ribs for diffuser 32. This helps the latter to withstand the pressure. This embodiment is therefore preferred when the material used to make diffuser 32 has relatively low mechanical strength and/or relatively low heat conductivity. Advantageously, diffuser 32 is obtained by die forging or moulding. This embodiment is shown in FIGS. 14 and 15.

Heating means 30 include at least one resistance positioned on a second wall 34 of the diffuser, the second wall 34 being opposite the first wall. Advantageously, this device is a thick film or photo-etching resistor. It results from the deposit of an electrically resistive ink. For example the so-called thick film or printed circuit by photo-engraving type. For reasons of clarity, reference will only be made to serigraphed products. In each of the embodiments described hereafter, the thick film resistor may be replaced by a photo-etching resistor.

Figure 8:
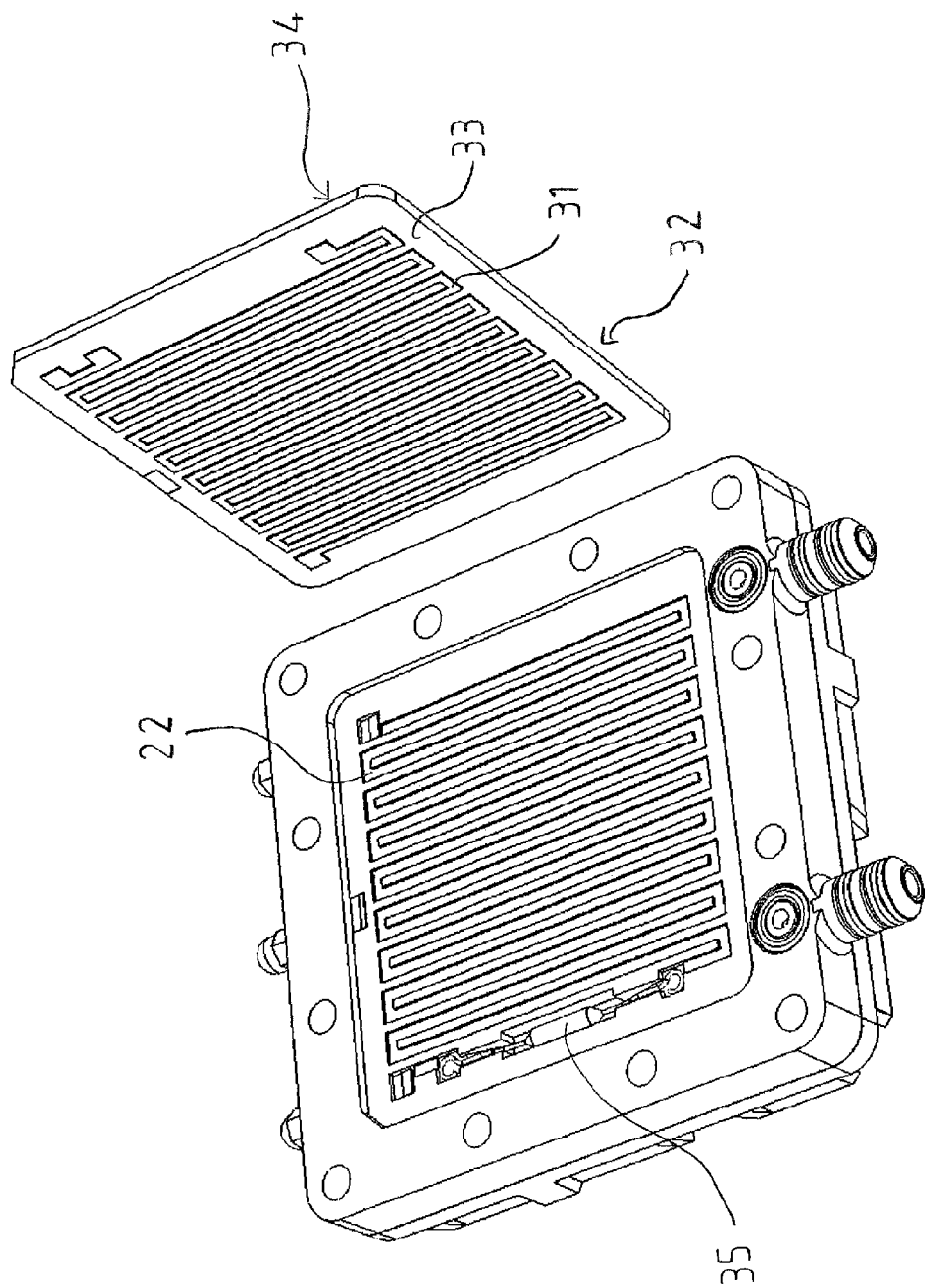
FIG. 8 is a view in perspective of a support, a diffuser of a boiler according to the example of the boiler shown in FIG. 1.
Figure 9:
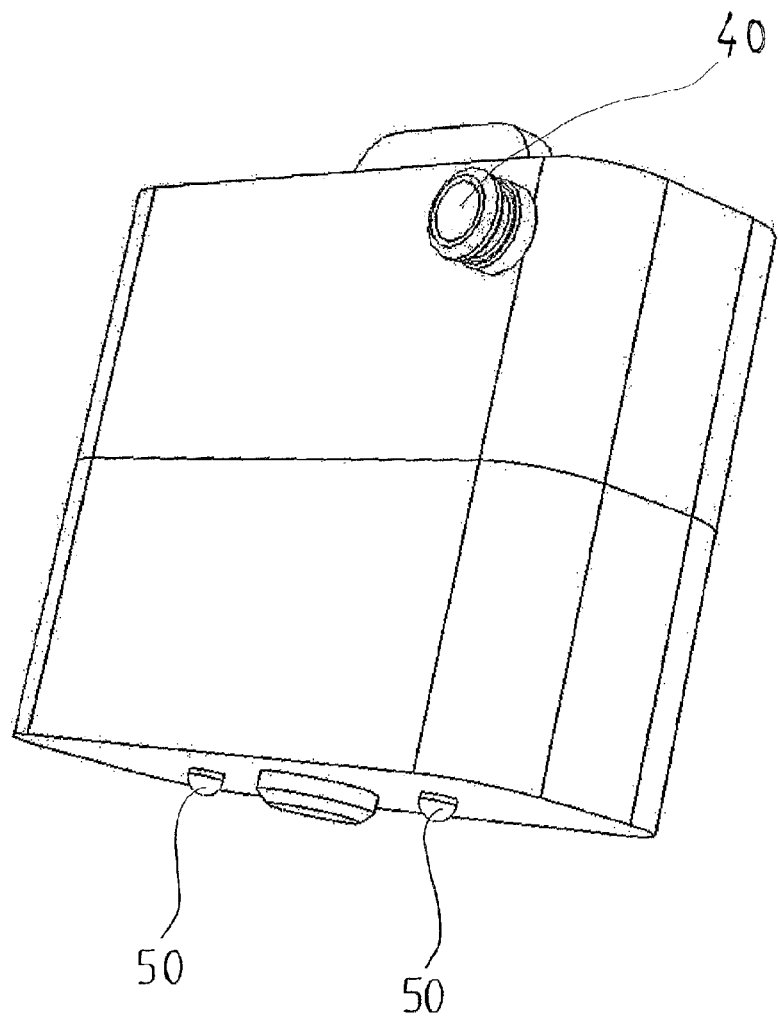
FIGS. 9, 10 and 11 are views in perspective of another embodiment of the invention.
Figure 10:
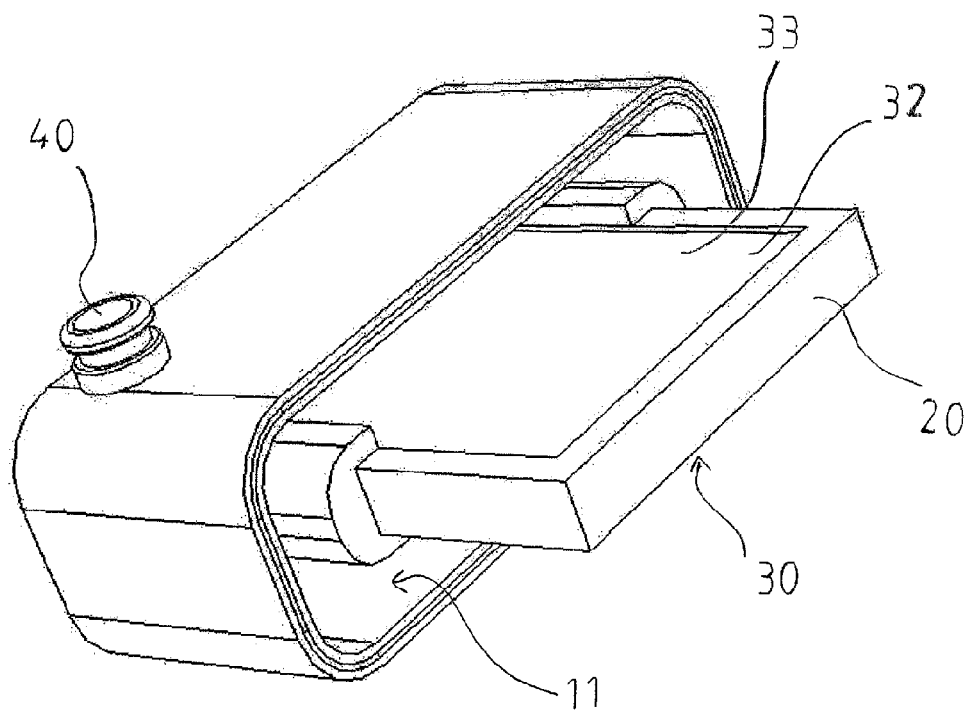
Figure 11:
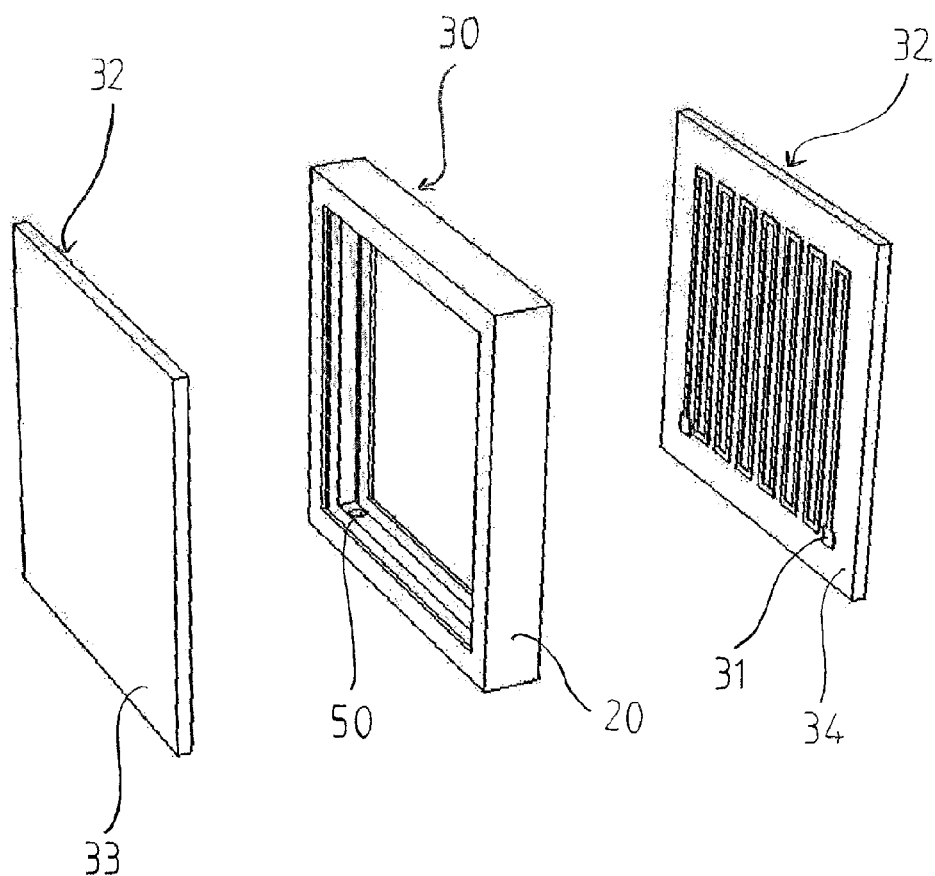

Thick film resistor 31 comprises at least one track forming a pattern on second wall 34 as shown in FIG. 8. The resistance includes a serigraphed track or several tracks defining the pattern. This pattern may form a serpentine for instance as shown in the example. It can also form a spiral or a series of concentric or juxtaposed circles, or any other form.

When electricity is supplied to thick film resistor 31 it generates heat which is transmitted to diffuser 32 then to the liquid occupying heating volume 11.

For example, thick film resistor 31 may have heating power of between 1300 W and 2500 W, and more particularly around 1800 W.

Advantageously, diffuser 32 has a thermal conductivity that is above or equal to 10 W/m/K and more especially thermal conductivity of between 10 W/m/K and 400 W/m/K. This choice of diffuser 32 promotes the transmission of heat between thick film resistor 31 and the liquid. A diffuser 32 essentially made of aluminium, stainless steel, ceramic, powder-coated steel or brass alloy will be preferred. Advantageously, first wall 33 receives a food industry lining. The purpose of the diffuser is to constitute the backing for thick film resistor 31 and to ensure that the heat diffuses well between thick film resistor 31 and the liquid.

The boiler is arranged so that heating volume 11 is positioned on either side of thick film resistor 31. Thus, heating means 30 are positioned at the heart of the boiler, and heating volume 11 is arranged on the periphery of heating means 30. Therefore, the difference in temperature between the boiler environment and the surfaces of the boiler in contact with this environment are much less than in the known boilers where the thick film resistor encloses the heating volume. As a result, less heat passes between the boiler and its environment. Almost all the thermal energy generated by the heating means is transmitted to the liquid. This improves the thermal efficiency of the boiler.

The body arranges the boiler so that it is thermally insulated from its environment. The preferred material will be plastic.

If, as in the embodiment shown on FIGS. 1 to 8, diffuser 32 has a plate shape, heating volume 11 is arranged so that first wall 33 and the second wall 34 are turned to face heating volume 11. This constitutes a sandwich type structure.

Plate type heating means are particularly simple to make and ensure uniform distribution of the temperature.

Preferably, the boiler is equipped with a support 20 on which second wall 34 bears and is protected from the liquid. Support 20 may be removably joined to the body or not.

In the example illustrated on FIGS. 1 to 8, the boiler is equipped with two diffusers 32, 32, two walls 34, 34 of which are positioned opposite one another. Each of these two walls 34, 34 has at least one thick film resistor 31, 31. Each one of these second walls 34, 34 bears on support 20, on their periphery at least. This support contributes to maintaining in positioning diffuser 32 on support 20. Thus, thick film resistor 31 is covered and enclosed by heating volume 11. The latter is arranged on either side of the assembly formed by diffusers 32, 32. Thick film resistor 31 is housed inside the assembly formed by support 20 and the body. Therefore, less heat transfers between the boiler and its environment, thereby improving the thermal efficiency of the boiler.

In this example, support 20 includes at least one central zone destined to accommodate at least one diffuser 32 and at least one peripheral zone arranged on the periphery of the central zone. Advantageously, the central zone has a void 22 the surround of which ensures that diffuser 32 is centred and maintained in position by simple fitting together. This characteristic is shown on FIG. 8. The peripheral zone of support 20 is designed to receive part of the body. Thus, internal face 14 of the body is arranged in contact with first wall 33 of the diffuser so as to form a heating volume with the latter. This peripheral zone contributes to joining the body on support 20. Advantageously, it also helps to centre the body relative to support 20.

In the example shown on FIGS. 1 to 8, the body consists of two flasks 10, 10 each one designed to be associated with a diffuser 32 in order to define the heating volume. Each flask 10 has an external face and an internal face 14, the surround of which bears on the peripheral zone of support 20. Advantageously, each flask 10 is arranged so as to act as thermal insulation. The preferred material will be plastic.

The boiler is equipped with removable fixing means arranged to allow joining and removable separation of flask 10 and support 20. In the embodiment shown, the removable fixing means are equipped with connecting bolts 60 and nuts 61.

To this end, external face of flask 10 has bearing zones to receive and allow free access to a bolt head and the bearing zones in order to receive the nuts to be associated with a bolt, the head of which bears on the external surface of opposite flask 10.

Advantageously, flasks 10, 10 have recesses on their external face that roughly match those of the nuts in order to form stops and prevent the rotation of the nuts when their associated bolt is rotated.

Advantageously, the outer surface of the flasks has a surface relief forming cavities 12. This relief increases the contact surface between the air surrounding the boiler and the boiler. This relief also reduces any contact area between the boiler and the operator's hand. This lessens the risk of burns.

Heating means 11 include at least one thermostat 35. The purpose of this thermostat 35 is to limit the temperature of diffuser 32. This avoids the latter reaching a destructive temperature. It also prevents the parts in contact, in particular in plastic, reaching a destructive temperature. Each thermostat 35 is placed in a housing provided in the support or support means so as to be removable. It comes into contact with an electrical circuit associated with thick film resistance 31 by simply fitting diffuser 32 in the support means and in support 20; a thermal fuse may also be used. Advantageously, a thermostat will be provided for each thick film resistor. This characteristic is shown on FIG. 8.

As an illustration, a boiler according to the example described above has the following characteristics:

roughly square external shape measuring approximately 100 mm per side,
diffuser of around 58 $cm^2$,
boiler thickness of approximately 33 mm,
around 1800 W power,
the support is made essentially of plastic to withstand temperatures above 120° C. and with excellent mechanical characteristics, such as polysulfone, (PSU) polyamide (Pa), polybutylene terephthalate (PBT), or any other material with glassfibre reinforcement and recognised food industry quality.
the flask is made essentially of plastic to withstand temperatures above 120° C. and with excellent mechanical characteristics, such as polysulfone, (PSU) polyamide (Pa), polybutylene terephthalate (PBT), or any other material with glassfibre reinforcement and recognised food industry quality.

This boiler can easily raise 8.6 $cm^3$ of water from 20° C. to 95° C. in less than 10 seconds.

The support is equipped with means for liquid connection 40, 40 arranged to ensure liquid flows into the heating volume and liquid flows out of the heating volume.

Advantageously, the liquid connection between the boiler and a hydraulic circuit on the appliance is established by connecting the boiler connection means to the additional liquid connection means. The liquid connection means are arranged so that joining the boiler to the beverage-making machine creates a liquid connection of the liquid connection means to the additional liquid connection means. In a preferred arrangement, the liquid connection means include a male part equipped with o-rings 71. These parts are designed to insert into a female part on the additional liquid connection means.

The boiler is also equipped with electrical connection means arranged to come into contact with the complementary electrical connection means connected to the machine for making beverages in order to supply the boiler with electricity. These electrical connection means include three electrical connectors 50, 50, 50. The electrical connection means are arranged so that when the boiler is joined to the drinks preparation appliance, the electrical connection means automatically come into contact with the additional electrical connection means.

Thus, assembly of the boiler on the equipment automatically creates a liquid connection and an electrical connection between the boiler and the liquid and electrical supply circuits respectively.

Consequently, integrating the boiler in the beverage-making machine is a particularly simple operation since it requires that the operator only performs one operation. This ensures that the invention has considerable modularity as the boiler can be dismantled and refitted easily. Moreover, it guarantees a high degree of safety since once the appliance has been separated, the boiler is no longer connected electrically to an electrical power supply, which eliminates any risk of electrical shock or inadvertent activation of the thick film resistors.

The liquid connection means are equipped with an intake pipe 41 and an exit pipe 41. The pipes are housed in support 20. In a preferred arrangement, they are positioned at the level of a median plane of support 20. One end of each of the pipes discharges outside the boiler and the other end discharges into intermediate pipe 13 housed in the body. One end of each intermediate pipe 13 discharges into heating volume 11. Advantageously, the section of each intermediate pipe 13 increases between intake pipe 41 and the heating chamber in order to compensate for the expansion of the liquid due to its temperature increase between intake pipe 41 and heating chamber 11.

Support 20 is symmetrical relative to the median plane. The boiler assembly is also symmetrical relative to this same plane. Moreover, it has a second symmetrical plane normal to the median plane.

This symmetry limits the number of different parts and therefore the number of product references for the boiler. In fact, the boiler consists essentially of a support 20, two flasks 10, 10, two diffusers 32, 32, each one associated with a thick film resistor 31, 31, two peripheral seals 70, 70, and two thermostats 35, 35. This symmetry significantly simplifies assembly and dismantling of the boiler. In fact, the following parts can be arranged indifferently on one or the other side of support 20: flask 10, diffuser 32, thermostat 35, peripheral seal 70, bolt 30/nut 61. This reduces the complexity of the assembly procedure and therefore the cost. Moreover, this symmetry simplifies assembly and dismantling of the boiler on the beverage-making machine. Indeed, each of the male parts of the liquid connection means may be connected indifferently to a liquid supply network intake or exit. Therefore, the boiler does not have a preferred direction of assembly on the appliance. Maintenance and end-of-life dismantling of the boiler are considerably facilitated since each part can be easily dismantled or interchanged.

Advantageously, the circulation channel in the form of a coil has parallel linear sections.

In a preferred arrangement, the boiler is arranged so that in operation, the linear sections of the circulation channel extend mainly vertically. Thus, if one of the boiler intakes or exits or if both intake 40 and exit 40 are disconnected from the remainder of the machine hydraulic circuit, only the few sections connected directly to these intakes/exits will empty. Indeed, when a channel intake 40 or exit 40 is disconnected from the machine hydraulic circuit, the water contained in one section could escape through this opening. It will then be replaced by a volume of air. This volume of air will then be stopped at the part of the channel forming a link between the two upper ends of consecutive sections. Indeed, the density of the air prevents this volume of air descending along the following section. The advantage of this characteristic is that even when works require that the machine hydraulic circuit be opened or disconnected in part at least, of the boiler of this circuit, the boiler does not completely empty. Therefore, this boiler can be entirely withdrawn from the machine without this leading to it draining automatically. Hence, as soon as the boiler is once again connected to the machine, heating means 30 will be already in contact with the water trapped in the boiler. This reduces the risks of overheating. There is no need to refill the boiler before obtaining hot water.

The length of the circulation channel is defined by the distance that a given volume of liquid travels between the channel intake and the channel exit. The length of the channel conditions the time that the liquid takes to pass through the boiler and therefore the heat transferred to the liquid. It also conditions the area occupied by the channel and the dimensions of heating volume 11 and the boiler.

Advantageously, the section of the circulation channel on a plane that is roughly normal to its direction of flow along the parallel sections varies between the circulation channel intake and at least half its length.

As illustrated in FIG. 7, the dimensions of transversal walls 16, 36 increase between the intake and at least the middle of the canal length. The canal section retains a surface that is roughly constant in order to ensure that there is a constant flow of liquid. Therefore, the dimensions of side walls 15, 15 is adapted to take account of the changing dimensions of transversal walls 16, 36.

Transversal wall 36 forming interface between circulation channel and diffuser 32 makes a significant contribution to heat exchange between diffuser 32 and the liquid. Thus, the larger this transversal wall 36, the greater the amount of heat that can be transferred to the liquid.

In fact, the quantity of heat transferred also depends on the temperature difference between second wall 34 of diffuser 32 and the liquid. The smaller this difference, the less the quantity of heat that is exchanged.

As a result, this particular configuration of the channel fosters the transmission of heat from a thick film resistor 31 to the liquid while its temperature increases.

According to a non-illustrated embodiment, the dimension of the transversal wall increases from the entrance up to the exit of the circulation channel.

In the illustrated example, in a particularly advantageous manner, the dimension of the transversal walls increases from the circulation channel intake up to the middle of its length. Beyond half of this length, this dimension decreases. The channel has perfect symmetry on a plane so that whatever the direction applied to boiler assembly, the circulation channel has the same configuration. In particular, each of end pipe 41, 41 of the circulation channel can be positioned either on an intake or exit from the liquid supply circuit on the machine.

By varying the previously described embodiment, support 20 and flasks 10, 10 may form a monobloc assembly. In this case, an opening in the monobloc assembly is provided in order to insert heating means 30. According to this variant, the body is equipped with a cover in order to close and seal the opening.

Other embodiments will now be described. These embodiments adopt all the characteristics of the example of the boiler previously described and only the characteristics mentioned below differ.

On the embodiments shown on FIGS. 9 to 13, the body forms a seal enclosure within which are housed heating means 30. The latter are enclosed within heating volume 11.

Support 20 forms an openwork frame that receives two diffusers 32, 32. The body includes joining means capable of co-acting with heating means 30 to allow removable joining of the latter in the body. To this end, two slides are arranged to ensure translatory guidance of heating means 30 and positioning of the latter on the body. These slides are arranged so as not to come into contact with the heating elements but to co-act for example with support 20.

Figure 12:
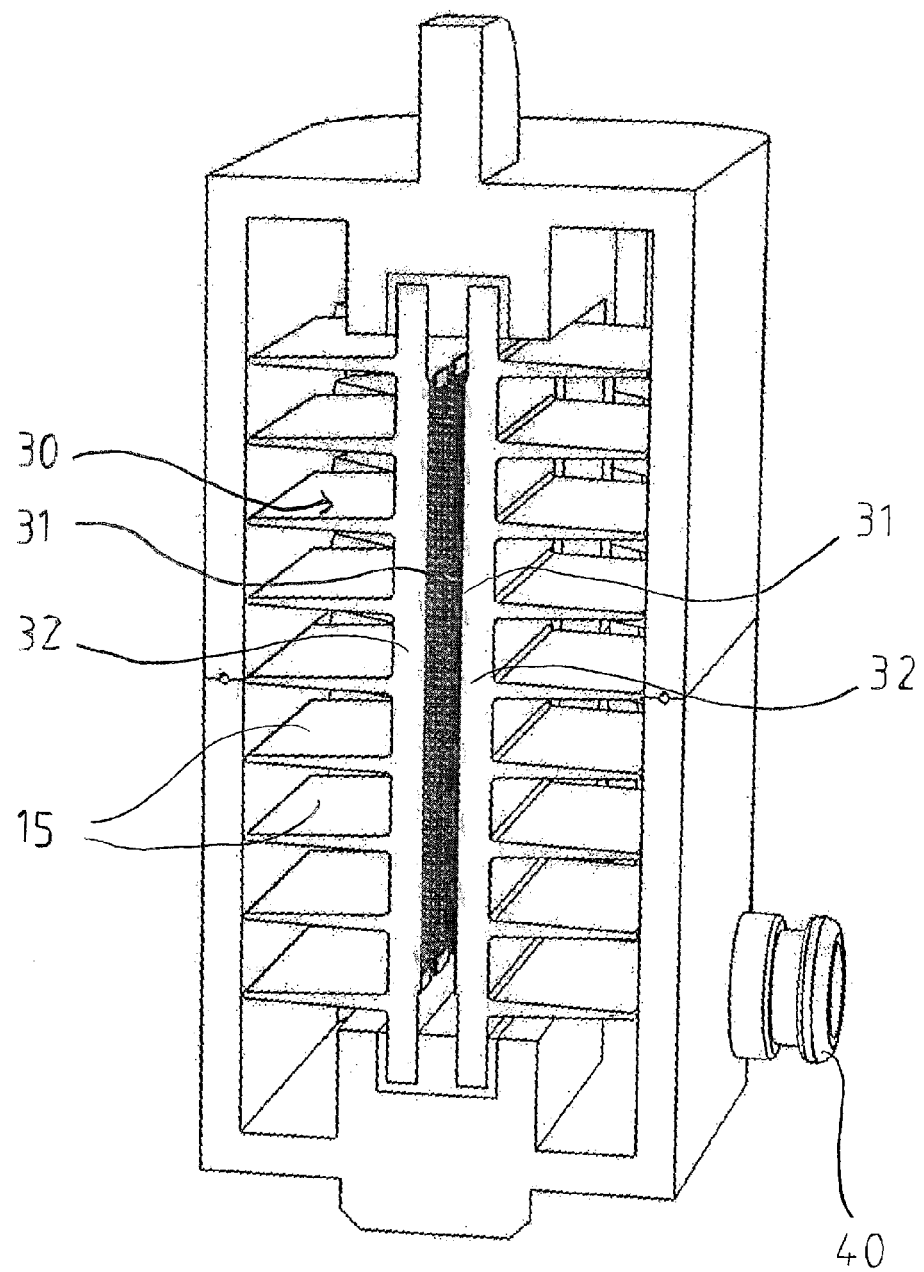
FIGS. 12 and 13 are views in perspective of yet another embodiment of the invention.
Figure 13:
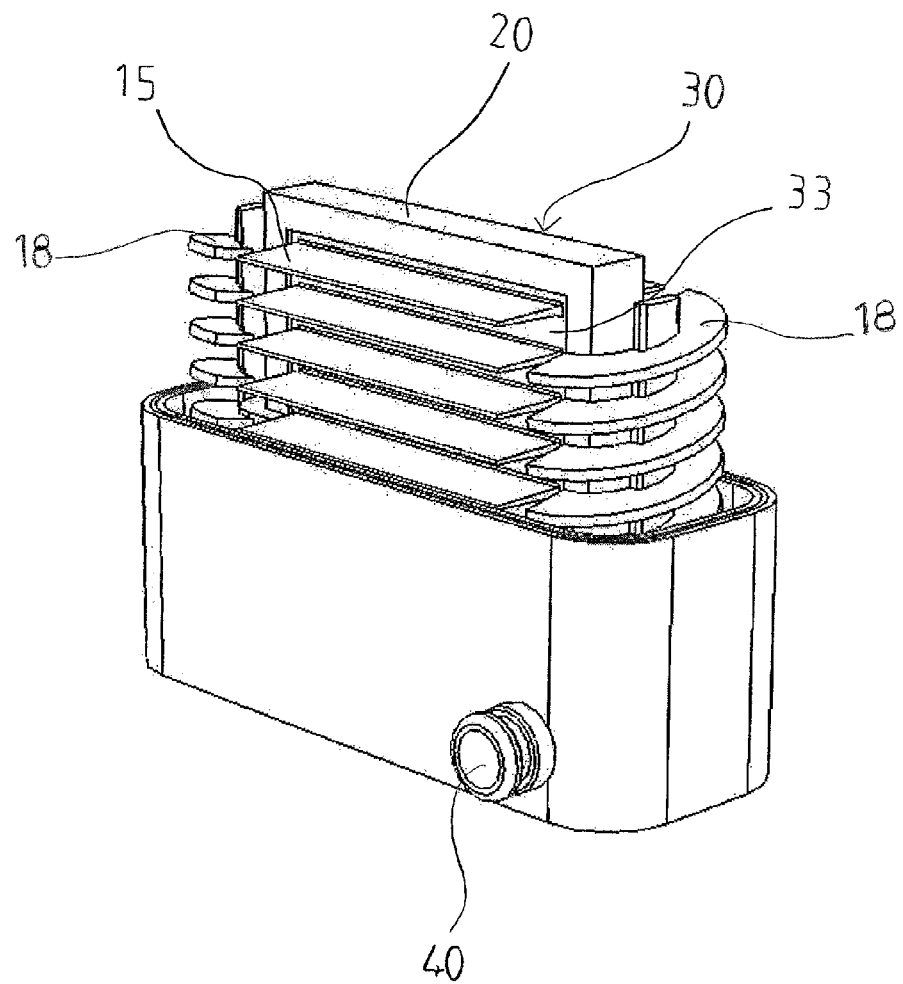

The embodiment shown on FIGS. 12 and 13 is a variant of the previous embodiment. According to this embodiment, heating means 30 are equipped with fins intended to act as side walls 15 in order to channel the circulating liquid. Furthermore, they increase the surface between the heating elements and the liquid. These fins equipped diffuser 32 from which they extend in a plane roughly normal to diffuser 32.

This embodiment brings a very substantial improvement to heat exchanges between heating means 30 and the liquid. The heating of the latter therefore takes place more quickly and uniformly.

FIG. 13 is a variant of the embodiment shown in the example on FIG. 12.

In this variant, the boiler has two profiles 18, 18. Profiles 18, 18, fins 15, diffuser 32 and the body are arranged so as to co-act and define the liquid circulation channel. This channel defines a helicoidal spiral with a vertical axis capable of guiding the liquid from intake 40 to exit 40 of boiler 1. By channeling the liquid towards the exit, this boiler optimises circulation of the liquid and tends to increase thermal exchanges.

A plastic profile is preferred. The profile may be removably secured onto the body, onto heating means 30 or support 20.

According to another embodiment not illustrated, the body is cylindrical, with circular or polygonal section. Moreover, the heating means are housed inside the body. They are roughly cylindrical and present a section that roughly matches that of the body. Hence, the body acts as a sleeve around the heating means. The heating volume is positioned either side of the heating means and encloses the thick film resistor.

A single diffuser can be envisaged on which are arranged one or several thick film resistors. Several diffusers arranged so as to form a cylinder can also be envisaged.

In each of these embodiments, the channel side walls may be supported either by diffuser 32 or by the body.

The boiler according to the invention has sealing means comprising at least one peripheral seal 70 arranged to ensure seal of heating volume 11. Preferably, seal 70 is arranged between inner face 14 and first wall 33 of diffuser 32. It is fitted on all the periphery of heating volume 11. As a result, the liquid remains enclosed between internal face 14 of the body and first wall 33 of diffuser 32. It cannot then reach second wall 34 of diffuser 32 and comes into contact with thick film resistor 31, or with the electrical connection means providing electrical conductivity between thick film resistor 31 and the electrical power supply. This arrangement of the seal is particularly effective, reliable and simple. In particular, it simplifies assembly of the electrical connection means.

Advantageously, for a plate-shaped diffuser 32, peripheral seal 70 adopts a rectangular or circular shape around the pattern formed by thick film resistor 31.

For a diffuser with cylindrical shape, the sealing means consist of two seals with section roughly identical to that of the diffuser and is installed along the cylinder axis on either side of the thick film resistor.

For each of the embodiments given as examples, side walls 15 defining the circulation channel can be either installed on diffuser 32 or on the body.

Advantageously, for each of these embodiments, the body encloses the heating means and constitutes an effective protection against damage to the latter and against the accidental burns.

A boiler according to this invention uses a small quantity of metal. This metal corresponds essentially to the diffuser and the connectors. This ensures that the invention limits the weight of the boiler and brings down the costs of the material and transport involved when using metal. In fact, the cost of transport is particularly high in an eco-design context since it is intended that the boiler will be removed from the equipment and sent to a maintenance centre for servicing.

For each one of these embodiments, the boiler is arranged so that it is particularly easy to assemble. Certain parts simply fit together (for instance the diffuser and support). Moreover, clip-on means can be provided to overcome the need for any tools or screwing operations when joining the flasks on the support.

The present invention is not limited to the embodiment described above but extends to any embodiment that conforms to its spirit.

REFERENCES

10. Flask
11. Heating volume
12. Cavity
13. Intermediate pipe
14. Internal face
15. Side walls
16. Second transversal wall
18. Profile
20. Support
22. Void
30. Heating means
31. Thick film resistor
32. Diffuser
33. First wall
34. Second wall
35. Thermostat
36. First transversal wall
40. Intake/exit channel
41. Intake/exit pipe
50. Electrical connectors
60. Bolt
61. Nut
70. Peripheral seal
71. O-ring

The invention claimed is:

1. A boiler for a machine for making hot beverages, the boiler comprising:
    at least two diffusers (32, 32), each of which comprises a first wall (33) destined to be placed in contact with a liquid to be heated and a second wall (34) opposite said first wall (33), wherein said first and second walls of each of said at least two diffusers are continuous so that, with respect to each of said at least two diffusers, the liquid only contacts said first wall;
    a support (20) made of plastic on which said second wall (34) of each of said at least two diffusers bears and that is protected from the liquid;
    heating means (30) for heating the liquid and comprising at least two serigraphed or photo engraved resistances (31, 31) that are each arranged on a respective said second wall (34); and
    a body which, with said first wall (33) of each of said two diffusers, defines a heating volume (11) inside which the liquid is to be heated, said body comprising a material with a thermal conductivity that is less than 1 W/m/K,
    wherein the boiler is arranged so that the heating volume (11) is positioned on both sides of said heating means (30).

2. The boiler according to claim 1, wherein each of said diffusers has a thermal conductivity that is above or equal to 10 W/m/K.

3. The boiler according to claim 1, wherein said body and said diffusers are arranged so that together they define at least one heating chamber.

4. The boiler according to claim 1, wherein said body and said diffusers are arranged so that together they define a liquid circulating channel.

5. The boiler according to claim 1, wherein the heating volume (11) is positioned around the serigraphed or photo-etching resistances.

6. The boiler according to claim 1, wherein said diffusers are arranged to form a cylinder.

7. The boiler according to claim 1, wherein said at least two diffusers (32, 32) are turned so as to face one another.

8. The boiler according to claim 7, wherein said diffusers (32, 32) form roughly flat plates.

9. The boiler according to claim 7, wherein said diffusers (32, 32) are situated on either side of said support (20).

10. The boiler according to claim 9, wherein said support (20) is arranged so as to receive said at least two diffusers, and to receive at least two flasks (10, 10) forming at least parts of the body, wherein said two flasks each covers a respective said first wall (33) and, with said diffusers, defines at least one part of said heating volume (11).

11. The boiler according to claim 1, further comprising at least one seal (70) positioned between said first wall (33) and the body so as to seal heating volume (11).

12. The boiler according to claim 10, further comprising removable fixing means arranged so as to allow removable joining and removable separation of the body on said support (20), the removable fixing means including means for clipping the body on said support (20).

13. A coffee machine with the boiler according to claim 1.

14. The boiler according to claim 2, wherein said body and said diffusers are arranged so that together they define at least one heating chamber.

15. A boiler for a machine for making hot beverages, the boiler comprising:
   two body parts (10) that are separated from each other by a layered structure, each of said two body parts comprising a material with a thermal conductivity that is less than 1 W/m/K,
   said layered structure comprising a support (20) made of plastic, two heat diffusing plates (32) that are on opposite sides of said support, and two serigraphed or photo engraved resistances (31) that are each between a respective one of said two heat diffusing plates and said support,
   said two body parts each being separated from a respective one of said two heat diffusing plates by a heating volume (11) that is on opposite sides of said layered structure and in which a liquid is to be heated,
   each of said two heat diffusing plates comprising two opposite walls including a first wall that is arranged to contact the liquid and a second wall supporting a respective one of the two serigraphed or photo engraved resistances, wherein each of said two heat diffusing plates is continuous so that, with respect to each of said two heat diffusing plates, the liquid only contacts the first wall.

* * * * *

UNITED STATES PATENT AND TRADEMARK OFFICE
CERTIFICATE OF CORRECTION

PATENT NO. : 8,607,694 B2  
APPLICATION NO. : 12/676458  
DATED : December 17, 2013  
INVENTOR(S) : Blanc et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this
Twenty-second Day of September, 2015

Michelle K. Lee
*Director of the United States Patent and Trademark Office*